US012616947B2

(12) United States Patent
Schlueter et al.

(10) Patent No.: US 12,616,947 B2
(45) Date of Patent: May 5, 2026

(54) SYSTEMS AND METHODS FOR MONITORING AND CONTROLLING DILUTION RATES

(71) Applicant: Sonny's HFI Holdings, LLC, Wilmington, DE (US)

(72) Inventors: Nathan Schlueter, Bloomington, MN (US); Ken Martin, Little Canada, MN (US); Caleb Hatch, Prior Lake, MN (US); Andrew Edmunds, Woodbury, MN (US); Curtis A. Carlson, Stillwater, MN (US); Daniel Longhenry, Bloomington, MN (US); Pa Mong Xiong, Maplewood, MN (US); Megan Ren, Solon, OH (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 860 days.

(21) Appl. No.: 17/976,147

(22) Filed: Oct. 28, 2022

(65) Prior Publication Data

US 2023/0139033 A1 May 4, 2023

Related U.S. Application Data

(60) Provisional application No. 63/274,564, filed on Nov. 2, 2021.

(51) Int. Cl.
*B01F 35/82* (2022.01)
*B01F 23/40* (2022.01)
(Continued)

(52) U.S. Cl.
CPC ............ *B01F 35/82* (2022.01); *B01F 23/451* (2022.01); *B01F 23/483* (2022.01); *B01F 23/49* (2022.01);
(Continued)

(58) Field of Classification Search
CPC .................... Y01T 137/0324; Y10T 137/0324
See application file for complete search history.

(56) References Cited

U.S. PATENT DOCUMENTS

| | | | |
|---|---|---|---|
| 4,257,527 | A | 3/1981 | Snyder et al. |
| 4,938,590 | A | 7/1990 | Ishida |

(Continued)

FOREIGN PATENT DOCUMENTS

| | | | |
|---|---|---|---|
| CA | 2120504 | A1 | 6/1993 |
| CA | 1325464 | C | 12/1993 |

(Continued)

OTHER PUBLICATIONS

Official Action dated Mar. 12, 2025 in connection with European patent application No. 22814248.5, 4 pages.

(Continued)

*Primary Examiner* — Suresh Suryawanshi
(74) *Attorney, Agent, or Firm* — Dorsey & Whitney LLP

(57) ABSTRACT

A fluid dilution control system includes a processor and a plurality of sensors communicatively coupled to the processor. Each of the plurality of sensors is configured to sense a tracer component in a mixed solution of solution and motive fluid, where the tracer component is present in a pre-defined amount in the solution prior to being mixed with the motive fluid in the mixed solution. Each of the plurality of sensors senses a level of the tracer component present in the mixed solution and transmits the sensed information to the processor such that the processor compares the sensed level of each tracer component to a target level of a respective tracer component and causes a rate of dilution of one or more solutions containing the sensed tracer component to be adjusted to reach the target level of the respective tracer component.

12 Claims, 5 Drawing Sheets

(51) Int. Cl.

| | |
|---|---|
| ***B01F 23/451*** | (2022.01) |
| ***B01F 25/312*** | (2022.01) |
| ***B01F 35/21*** | (2022.01) |
| *B01F 101/00* | (2022.01) |

(52) U.S. Cl.
CPC .... *B01F 25/31243* (2022.01); *B01F 35/2132* (2022.01); *B01F 2101/2204* (2022.01)

(56) References Cited

U.S. PATENT DOCUMENTS

| | | | | |
|---|---|---|---|---|
| 5,746,238 | A * | 5/1998 | Brady | B01F 35/75 137/101.19 |
| 6,360,138 | B1 | 3/2002 | Coppola et al. | |
| 6,533,449 | B1 * | 3/2003 | Auad | B01F 35/2136 366/132 |
| 6,718,216 | B2 | 4/2004 | Grier | |
| 7,045,021 | B2 | 5/2006 | Ewing et al. | |
| 7,121,140 | B2 | 10/2006 | Lo | |
| 7,399,985 | B2 | 7/2008 | Mruk et al. | |
| 7,872,610 | B2 | 1/2011 | Motzer et al. | |
| 8,163,096 | B2 | 4/2012 | Belanger et al. | |
| 8,322,367 | B2 | 12/2012 | Harris et al. | |
| 8,527,372 | B2 | 9/2013 | Sanville et al. | |
| 8,887,743 | B2 | 11/2014 | Molitor et al. | |
| 8,899,452 | B2 | 12/2014 | Takanohashi | |
| 9,389,114 | B2 | 7/2016 | Rietsch et al. | |
| 9,421,566 | B2 | 8/2016 | Harris et al. | |
| 10,144,396 | B1 | 12/2018 | Krause et al. | |
| 10,730,486 | B1 | 8/2020 | Krause et al. | |
| 11,337,381 | B1 | 5/2022 | Nelson et al. | |
| 11,486,755 | B2 | 11/2022 | Dam-Huisman | |
| 2003/0056841 | A1 * | 3/2003 | Dalhart | B01F 23/451 137/889 |
| 2004/0220817 | A1 | 11/2004 | Sanville et al. | |
| 2008/0046278 | A1 | 2/2008 | Sanville et al. | |
| 2009/0088874 | A1 | 4/2009 | Arceo et al. | |
| 2010/0163567 | A1 | 7/2010 | Chiang et al. | |
| 2010/0186778 | A1 | 7/2010 | Martin | |
| 2011/0052379 | A1 | 3/2011 | Link | |
| 2011/0192433 | A1 | 8/2011 | Harris et al. | |
| 2012/0004776 | A1 | 1/2012 | Abad | |
| 2013/0103585 | A1 | 4/2013 | Carapelli | |
| 2015/0316455 | A1 * | 11/2015 | Anderer | B01F 35/2209 366/152.2 |
| 2016/0037738 | A1 | 2/2016 | Kato et al. | |
| 2016/0050862 | A1 | 2/2016 | Walliser | |
| 2016/0185589 | A1 | 6/2016 | Uhlhorn et al. | |
| 2017/0058244 | A1 * | 3/2017 | Labarge | B01F 21/221 |
| 2017/0185092 | A1 | 6/2017 | Mäkinen et al. | |
| 2017/0189868 | A1 | 7/2017 | Meyer et al. | |
| 2018/0345918 | A1 | 12/2018 | Foerg et al. | |
| 2019/0022607 | A1 | 1/2019 | Flood | |
| 2019/0056977 | A1 | 2/2019 | Wang et al. | |
| 2019/0390925 | A1 * | 12/2019 | Sangli | B01F 25/31243 |
| 2020/0022322 | A1 | 1/2020 | Lafian | |
| 2020/0180937 | A1 | 6/2020 | Frith et al. | |
| 2020/0396917 | A1 | 12/2020 | Olesen et al. | |
| 2021/0053018 | A1 | 2/2021 | Dyer | |
| 2021/0349482 | A1 | 11/2021 | Martin et al. | |
| 2021/0354097 | A1 * | 11/2021 | Flood | B01F 25/422 |
| 2023/0083515 | A1 | 3/2023 | Lansing et al. | |
| 2024/0158220 | A1 | 5/2024 | Martin et al. | |
| 2024/0159582 | A1 | 5/2024 | Martin et al. | |

FOREIGN PATENT DOCUMENTS

| | | | |
|---|---|---|---|
| CN | 209002347 | U | 6/2019 |
| CN | 110588581 | A | 12/2019 |
| CN | 111623852 | A | 9/2020 |
| CN | 112470907 | A | 3/2021 |
| EP | 0631119 | A1 | 12/1994 |
| EP | 1795875 | B1 | 10/2008 |
| JP | H0761225 | B2 | 7/1995 |
| JP | H0785694 | B2 | 9/1995 |
| JP | 2556232 | B2 | 11/1996 |
| JP | 2556232 | Y2 | 12/1997 |
| JP | H10300558 | A | 11/1998 |
| JP | 4242629 | B2 | 1/2009 |
| JP | 5196355 | B2 | 2/2013 |
| JP | 2022045794 | A | 3/2022 |
| JP | 2022046994 | A | 3/2022 |
| KR | 20150123304 | A | 11/2015 |
| KR | 20160076491 | A | 6/2016 |
| KR | 20170001251 | U | 4/2017 |
| WO | 2008024910 | A2 | 2/2008 |
| WO | 2020227822 | A1 | 11/2020 |
| WO | 2021225791 | A1 | 11/2021 |

OTHER PUBLICATIONS

International Search Report and Written Opinion dated Feb. 24, 2023 in connection with International Patent Application No. PCT/US2022/048211, 11 pages.
Communication Pursuant to Article 94(3) EPC dated Jun. 5, 2024 in connection with European patent application No. 21724944.0, 7 pages.
Examination Report dated Oct. 16, 2024 in connection with New Zealand Patent Application No. 793136, 4 pages.
"Dosatron CS33 ChemStick With Bung Adaptor, 33 In." Kleen RiteCorp, obtained from <https://www.kleen-ritecorp.com/p-66257-dosatron-cs33-chemstick-with-bung-adaptor-33-in.aspx>.
"Drum Plug Types," Gizmo Engineering, obtained from <https://gizmo-engineering.com/information/technical-information/drum-plug-styles/>.
Office Action dated Feb. 9, 2024 in connection with Canadian patent application No. 3,178,838.
International Search Report and Written Opinion dated Feb. 19, 2024 in connection with International Patent Application No. PCT/US2023/037087, 13 pages.
International Search Report and Written Opinion dated Feb. 21, 2024 in connection with International Patent Application No. PCT/US2023/037088, 15 pages.
International Search Report and Written Opinion dated Jul. 28, 2021 in connection with PCT/US2021/028600, 13 pages.
International Search Report and Written Opinion dated May 24, 2024 in connection with International Patent Application No. PCT/US2024/018614, 14 pages.

* cited by examiner

SYSTEMS AND METHODS FOR MONITORING AND CONTROLLING DILUTION RATES

CROSS-REFERENCE TO RELATED APPLICATION

This application claims priority to U.S. Provisional Patent Application No. 63/274,564, filed Nov. 2, 2021, entitled "System and Methods for Monitoring and Controlling the Dilution Rates," the contents of which are hereby incorporated in the entirety and for all purposes.

TECHNICAL FIELD

Dilution control systems sense and control dilution rates of mixed solutions, and more particularly sense a level of a tracer in mixed solutions to control dilution rates of solution delivery systems.

BACKGROUND OF THE INVENTION

Monitoring the dispensing of chemicals using feedback sensors typically involves detecting the presence of an object, such as a vehicle in a car wash, using ultrasonic or photoelectric sensors and dispensing fluids in locations where the vehicle is positioned. Photoelectric sensors (e.g., photo eyes) may use infrared light to detect the presence of objects, which may result in fluid delivery equipment delivering treatment. For instance, the photoelectric sensors may cause car wash equipment to operate for a certain amount of time that is appropriate to the length of the vehicle, as sensed by the photoelectric sensors. Ultrasonic sensors use sound waves to similarly detect the presence of objects and may result in delivering treatment to the objects.

These photoelectric and ultrasonic sensors, however, are unable to detect a concentration of chemical delivered by the fluid delivery equipment. Instead, chemicals are diluted with water prior to their application, and the dilution rate is controlled by metering devices that deliver concentrated chemical in metered amounts. The amount of chemical dispensed per volume of water can be determined based on a flow rate of a metering device, resulting in an intended dilution rate, and the metering devices may be adjusted, such as by turning a metering dial, to adjust the metering rate of the chemical dispensed to reach a desired dilution rate.

Due to the variability in the operation of metering devices, for instance, due to changes in performance over the lifespan of the metering device or across different models or types of metering devices, actual dilution rates of the chemical may differ from the dilution rate intended to be delivered by the metering device's settings. It is therefore necessary to identify approaches in which actual dilution rates may be accurately calculated so that metering devices can be adjusted to meter the dispensed chemical to result in an intended dilution rate.

SUMMARY

Accordingly, implementations of the present disclosure are directed to tracking and adjusting dilution rates of mixed solutions, e.g., mixtures of chemicals, in a fluid delivery system setting using a computer-implemented dilution system communicatively coupled to one or more sensors for determining an amount of diluted chemical present in a mixed solution. The sensors may be used to detect a dilution rate, such as an amount (e.g., concentration, distribution frequency, etc.) of a tracer component present within a mixed solution, where the tracer component is initially present in a solution, e.g., a concentrated chemical, in a pre-defined amount (e.g., concentration, distribution frequency, etc.) prior to being mixed in the mixed solution. The tracer component may be naturally suspended within and relatively evenly distributed throughout the solution, in some examples. In other examples, emulsifiers and/or suspension agents may be added to the solution to cause the tracer component to be evenly distributed and remain suspended with relatively even distribution within the solution. In yet other examples, the solution may be periodically agitated or mixed to relatively evenly distribute the tracer component within the solution. Based on the sensed dilution rate, the dilution system may determine whether the actual dilution rate is at a target dilution rate, and the system may adjust a rate of a solution dispensed to reach a target dilution rate of the mixed solution, which may thereafter be confirmed by sensing a corresponding amount of tracer component.

In one implementation, a fluid dilution control system includes a processor and a plurality of sensors communicatively coupled to the processor. Each of the plurality of sensors may be configured to sense a tracer component in a mixed solution of solution and motive fluid. The tracer component may be present in a pre-defined amount in the solution prior to being mixed in the mixed solution. In addition, each of the plurality of sensors may sense a level (e.g., concentration, distribution frequency, etc.) of the tracer component present in the mixed solution and may transmit the sensed information to the processor. The processor may compare the sensed level of each tracer component to a target level of a respective tracer component, and may cause a rate of dilution of one or more solutions containing the sensed tracer component to be adjusted to reach the target level of the respective tracer component.

In various implementations and alternatives, the processor may confirm a target dilution rate has been reached based on receiving sensed information from the sensor such as by determining an adjusted level of the tracer component present in the mixed solution corresponds to the target level of the respective tracer component.

In addition or alternatively, a metering device may adjust the rate of dilution based on receiving instructions from the processor, and for instance each of the plurality of sensors may be coupled to a fluid line holding the mixed solution containing the respective tracer component, and the fluid line may be arranged downstream from a respective metering device and a motive fluid source. In addition or alternatively, a metering device may adjust the rate of dilution, where the metering device includes a solution inlet of an eductor configured to receive the solution and the motive fluid in a mixing chamber thereof, and where a size of an orifice supplying the solution to the solution inlet is adjusted to reach the target level of the respective tracer component, and/or the metering device includes a positive displacement pump configured to impinge on a chemical delivery tube of the metering device, and a rate of displacement of the solution from the chemical delivery tube may be adjusted to reach the target level of the respective tracer component.

In another implementation, a fluid dilution control system includes a processor, a solution delivery system including a plurality of actuators, a plurality of fluid chambers, and a plurality of metering devices. Each of the plurality of actuators may be coupled to a fluid chamber of the plurality of fluid chambers. Each of the plurality of metering devices may be coupled to a fluid chamber of the plurality of fluid chambers. Each of the plurality of actuators may be coupled to a motive fluid supply and configured to be actuated to cause motive fluid from the motive fluid supply to flow into a port of a corresponding fluid chamber of the plurality of fluid chambers. The plurality of fluid chambers may be configured to receive the motive fluid and a solution and form a mixed solution therein. The plurality of metering devices may be configured to deliver the solution to a corresponding fluid chamber of the plurality of fluid chambers and meter the solution into the fluid chamber at a selected metering rate. The fluid dilution control system further includes a plurality of sensors that may each be communicatively coupled to the processor and arranged downstream of a different fluid chamber of the plurality of fluid chambers. Each of the plurality of sensors may be configured to sense a tracer component in the mixed solution formed in one of the plurality of fluid chambers, where the tracer component may be present in a pre-defined amount in the solution prior to being mixed in the mixed solution. Each of the plurality of sensors may sense a level of the tracer component present in the mixed solution and transmit the sensed information to the processor where the processor compares the sensed level of each tracer component to a target level of a respective tracer component, and based on the comparison, the processor may cause at least one metering device of the plurality of metering devices to adjust the selected metering rate to reach the target level of the respective tracer component.

In various implementations and alternatives, the motive fluid supply coupled to the plurality of actuators may be a common motive fluid supply coupled to a pump configured to deliver the motive fluid at a constant pressure, each of the plurality of sensors may be coupled to a fluid line arranged downstream of the plurality of fluid chambers, at least one of the plurality of metering devices may include a solution inlet of an eductor and a size of an orifice supplying the solution to the solution inlet may be adjusted to adjust a level of solution dispensed into the motive fluid, and/or at least one of the plurality of metering devices may include a positive displacement pump configured to impinge on a solution delivery tube of the metering device, and wherein a rate of displacement of the solution from the solution delivery tube is adjusted to reach the target level of the respective tracer component.

In a further implementation, a computer network includes a plurality of communications gateways, each located at a location, where the location is different from locations of the other communications gateways. The network includes at least one fluid dilution control system communicatively coupled to each communications gateway, the at least one fluid dilution control system including an onboard processor and a plurality of sensors communicatively coupled to the processor. Each of the plurality of sensors may be configured to sense a tracer component in a mixed solution of solution and motive fluid, the tracer component present in a pre-defined amount in the solution prior to being mixed in the mixed solution. The processor may be configured to receive a signal from an external controller located at the location, where the signal is for metering a level of solution to reach a selected dilution rate, Each of the plurality of sensors may sense a level of the tracer component present in the mixed solution and transmit the sensed information to the processor, and the processor may compare the sensed level of each tracer component to a target level of a respective tracer component corresponding to the selected dilution rate, and may cause a rate of dilution of one or more solutions containing the sensed tracer component to be adjusted to reach the target level of the respective tracer component.

In various implementations and alternatives, the processor may cause the rate of dilution of the one or more solutions to be adjusted by generating a separate signal from the signal received by the external controller, and may send the generated signal to a metering device configured to adjust the rate of dilution.

DETAILED DESCRIPTION

Implementations provide a dilution control system 100 configured to monitor and control dilution operations for use in fluid delivery systems according to the present disclosure. The dilution control system 100 analyzes a mixed solution of a solution (e.g., a concentrated chemical) and motive fluid to determine whether a dilution rate of the solution is at a target dilution rate, and adjusts the metering operations of the dilution control system 100 to reach the target dilution rate. The analysis involves sensing a level of tracer component in the mixed solution, where the tracer component is present in a pre-defined amount (e.g., concentration) within the initial solution (e.g., concentrated chemical). The tracer component may have properties detectable by sensors such as electrical conductivity, total dissolved solids (TDS), water hardness, salinity, pH, dissolved oxygen, color, viscosity, and these detectable properties may change when the solution is diluted in a mixed solution of fluid, e.g., motive fluid, such as water. Thus, the sensors may be electrical conductivity sensors, TDS sensors, ion-selective electrodes, salinity sensors, pH sensors, oxygen sensors, spectral analysis sensors (e.g., spectrophotometric sensors), viscosity sensors, and combinations thereof for sensing the detectable properties of the tracer component. One or more tracer components may be present in the solution as a native component contributing to the function of the solution, or as an additive to the solution. The one or more tracer components may be active or non-active within the solution. Based on the sensed level of the tracer component, the dilution control system may adjust the metering operations, for instance to increase or decrease a level of solution dispensed into the system 100, and may continue to analyze the mixed solution to determine whether a target dilution rate has been achieved in the mixed solution. Dilution control systems 100 may be used in applications such as car washes, reverse osmosis, water softening, nutrient and pesticide delivery such as in agricultural applications, and water reclamation and accordingly the solutions may provide a variety of functions and the solutions may be concentrated chemicals such as concentrated detergents, ion exchange concentrates, water softening agents, plant nutrients, herbicides, fungicides, and insecticides, and water treatment concentrates such as biocides and disinfectants. Motive fluid may include water such as pumped water.

Figure 1A:
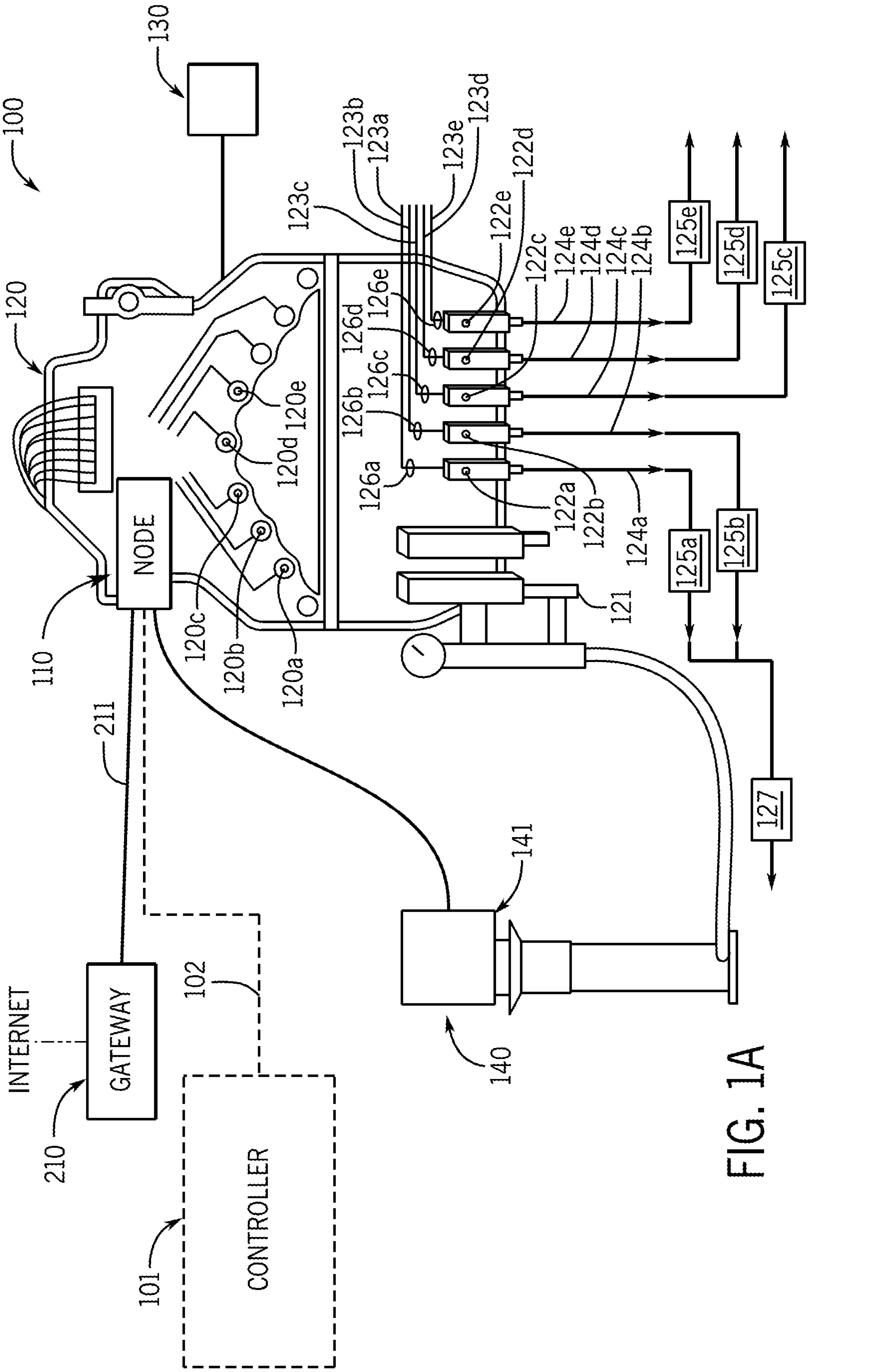
FIG. 1A illustrates a dilution control system for monitoring and controlling dilution operations for use in fluid delivery systems according to the present disclosure.

Turning to FIG. 1A, illustrated is the dilution control system 100. The dilution control system 100 may include a processor 110, a solution delivery system 120 for mixing solutions (e.g., concentrated chemicals) with motive fluid to form one or more mixed solutions, and a power source 130. The dilution control system 100 may optionally include a pump 140. Each of these may be housed within the same location where solutions are diluted in motive fluid (e.g., pumped water). As illustrated in FIG. 1A, the dilution control system 100 may include the processor 110 and solution delivery system 120 integrated into a single assembly, and may include inputs for a connector 102 (described herein), the power source 130, and connection 211 (described herein).

The dilution control system 100 may be configured to monitor and control dilution operations by receiving signals from the processor 110, from an optional external controller 101 at the same location as the dilution control system 100, or from a combination thereof. In response to receiving the signals, the processor 110 of the dilution control system 100 may interpret the signals and instruct the dilution control system 100 to operate, such as by adjusting a rate of delivery of solutions from the solution delivery system 120. The dilution control system 100 may be operated via the processor 110 and the power source 130 of the dilution control system 100, both of which may be separate from the optional external controller 101 and any related components, e.g., separate from power and memory of such external controller 101. This may enable the processor 110 to control when and if the dilution control system 100 will operate upon receiving the signals from the external controller 101. For example, as described further herein, where the external controller 101 typically controls the operations of the solution delivery system 120, the dilution control system 100 may instead control the operations of the solution delivery system 120 by overriding signals sent by the external controller 101. In this example, the solution delivery system 120 may be a legacy component of a pre-existing dilution control system operated by the external controller 101, also known as a customary car wash controller of the legacy component.

According to the present disclosure, the processor 110 of the dilution control system 100 may use onboard memory and programming for controlling the dilution control system 100. The processor 110 may be communicatively coupled to the solution delivery system 120, the power source 130, the pump 140, the external controller 101, as well as other system and network components of the present disclosure; and may be configured to send and receive signals to and from these communicatively coupled components. The processor 110 may be configured, for instance, as a microcontroller or a computer processor depending processing requirements for operating the dilution control system 100. The processor 110 may generate control signals to, for instance, cause the power source 130 to power on/off the dilution control system 100 and cause the solution delivery system 120 to cause solutions (e.g., concentrated chemicals) and motive fluid to be mixed according to a target dilution rate. In some cases, the processor 110 may instruct the dilution control system 100 to be powered at a voltage independent of a sensed voltage from the external controller 101 such that dilution control system 110 is not capable of converting voltage received from the external controller 101 into a different voltage for operation of electrical components coupled to the solution delivery system 120. However, the dilution control system 100 may include a voltage converter that takes a standard input (e.g., 24 VDC) for valve actuation and converts to a different voltage (e.g., 5 VDC) for the processor 110, but such a converter may not be present at an interface between the dilution control system 100 and the external controller 101.

The processor 110 may be powered via a communications link, such as a link from network components at the setting housing the dilution control system 100. For instance, the processor 110 may be coupled via a serial communication cable to a network component and may be powered therefrom. In addition or alternatively, the processor 110 may be powered from another power source, for instance, depending upon the need for connection of sensors or actuators and their power demand. In some implementations, the processor 110 is powered from the power source 130.

The solution delivery system 120 of the dilution control system 100 may be configured to facilitate fluid distribution, e.g., solution, motive fluid and mixed solution distribution, and mixing of solution and motive fluid to form the mixed solution, in response to receiving control signals from the processor 110. The solution delivery system 120 may be configured with actuators that control valves, and the processor 110 may be referred to as a valve node. The valve(s) may be coupled to one or more fluid chambers configured to mix a solution (e.g., a concentrated chemical) and water in a mixed solution in which the solution is diluted, and distribute the mixed solution. For instance, the dilution control system 100 may include one or more solenoid valves, each operatively connected to a fluid chamber. By controlling an on/off status of the solenoid valve(s), fluid flow may be controlled through the fluid chamber(s). In FIG. 1A, upon operation of individual actuators such as solenoid valves 120*a*-120*e*, motive fluid from a motive fluid inlet 121 of the solution delivery system 120 may deliver motive fluid to corresponding motive fluid inlets of one or more fluid chambers 122*a*-122*e* fluidly coupled to solution supplies 123*a*-123*e* via solution inlets of the fluid chambers 122*a*-122*e*, and the motive fluid may mix with each of the respective solutions in their respective fluid chambers 122*a*-122*e*. The mixed solutions may each exit a mixed solution outlet 124*a*-124*e* of each of the respective fluid chambers 122*a*-122*e*. The solution delivery system 120 may be configured as a bank of valves and injectors in a dispensing panel that may be responsible for distributing mixed solutions from a plurality of fluid chambers coupled to the bank of actuators in response to receiving control signals from the processor 110 of the dilution control system 100. Injectors (such as venturi injectors, also known as eductors) may house the fluid chambers 122*a*-122*e* and may define mixed solution outlets 124*a*-124*e*, which may lead to one or more application areas where the mixed solution is applied or where the mixed solution is further mixed with other motive fluid, solutions, or mixed solution(s).

In some implementations, the fluid chambers 122*a*-122*e* each may be coupled to individual solution supplies 123*a*-123*e* via individual metering devices 126*a*-126*e*. The metering devices 126*a*-126*e* may include, for example, a solution inlet of a fluid chamber with an adjustable orifice supplying the solution to the solution inlet. The orifice opening may be adjusted to reach the target level of the respective tracer component. For example, the orifice may be widened or narrowed to permit more or less solution into the solution inlet of the fluid chamber to adjust a metering rate of the solution and the tracer component therein, such as using a pinch valve. In addition or alternatively, the metering devices 126*a*-126*e* may include a positive displacement pump such as a peristaltic pump that may positively displace fluid over an impingement path, and the rate of fluid displacement may be adjusted to increase or decrease a rate of solution delivery from the tube. Adjusting the rate of displacement may be through adjusting a rotation rate of one or more rollers of the peristaltic pump. Accordingly, in this example, the peristaltic pump may be configured to impinge on a solution delivery tube where a rate of displacement of the solution from the solution delivery tube may be adjusted to change a metering rate of the solution and the tracer component therein.

Chemical delivery systems that include actuators and eductors also known as venturi injectors are disclosed in U.S. Pat. No. 8,887,743 B2, the disclosure of which is incorporated herein by reference for any useful purpose. Chemical injectors may include a motive fluid inlet, a chemical inlet and a mixed solution outlet and may operate to draw in concentrated chemical (e.g., a solution) into a mixing chamber upon delivery of a motive fluid into the mixing chamber, which creates a vacuum pressure in the mixing chamber to thereby draw in the concentrated chemical. The metered amount of concentrated chemical drawn into the mixing chamber may be adjusted by adjusting a cross-sectional size of the flow path through which the chemical passes, which may adjust a flow rate of the chemical to thereby adjust a dilution rate. In addition or alternatively, the mixing chamber or chemical injector may receive concentrated chemical via a positive displacement pump. In some implementations, the motive fluid may be delivered via a common motive fluid supply, such as via a delivery manifold with a motive fluid inlet and a plurality of outlets each coupled to an injector. Manifolds for receiving and distributing motive fluid are also disclosed in U.S. Pat. No. 8,887,743 B2.

Implementations where a metering device configured to adjust a cross-sectional size of the flow path through which the concentrated chemical passes and which may be coupled to the chemical delivery system 120 at the solution inlets of the mixing chambers, injectors or other mixing devices, are disclosed in US 2019/0022607 A1, the disclosure of which is incorporated herein by reference for any useful purpose.

While the rate of distribution of solutions at the mixing devices, e.g., injectors, may be controlled by means such as controlling the size of a solution outlet port leading to the solution injector (e.g., including fluid chambers 122*a*-122*e*), controlling the size of the solution inlet port of the solution injector, controlling a metering rate of a pump, and so on, the intended or target rate of solution distribution may differ from the actual rate of distribution (e.g., due to the size of the outlet port being too large or too small for the intended rate of distribution) resulting in a mixed solution having a dilution rate that is off-target. Accordingly, the dilution control systems 100 of the present disclosure may include one or more sensors for sensing tracer components present in the mixed solution at or upon exiting the mixed solution outlet 124*a*-124*e* fluidly coupled to the fluid chamber 122*a*-122*e*. The tracer components may be components having detectable properties present in the solution supply, may be pre-existing components of the solution or may be added thereto, and may be active or inactive components relative to the function of the solution. Once the mixed solution is formed and/or distributed from the mixed solution outlet, e.g., one or more of mixed solution outlets 124*a*-124*e*, and before the mixed solution is further mixed or applied to a target, a sensor such as sensors 125*a*-125*e* may sense a level of a tracer component in the mixed solution and may determine a dilution rate of the solution in the mixed solution, or the sensed information may be sent to the processor 110 for determining the dilution rate.

As shown in FIG. 1A, the housings of each of the sensors 125*a*-125*e* may be coupled to fluid lines fluidly coupled to corresponding mixed solution outlets 124*a*-124*e* on a one-to-one basis such that each sensor may sense a tracer in the mixed solution of a mixture of a single solution with its tracer component and the motive fluid. The sensors 125*a*-125*e* may each be configured to sense one or more tracer components. For instance, the sensors 125*a*-125*e* may be configured to sense the same tracer component as the other sensors, or may be configured to sense a tracer component that differs from the tracer components sensed by other tracer components. In addition or alternatively, each of the sensors 125*a*-125*e* may be configured to sense different levels, e.g., discrete ranges, of the tracer component compared to the other sensors. In this way, solutions containing a specific tracer component or a specific level of tracer component may be fluidly coupled to the fluid chamber, e.g., 122*a*-122*e*, having the corresponding downstream sensor, e.g., 125*a*-125*e*, for sensing the tracer component or range of tracer component contained therein.

The sensors 125*a*-125*e* may be configured to sense properties such electrical conductivity, total dissolved solids (TDS), salinity, pH, dissolved oxygen, color, and the tracer component may be a corresponding component having such properties that are capable of being sensed by the sensor. Thus, the sensors 125*a*-125*e* may be electrical conductivity sensors, TDS sensors, salinity sensors, pH sensors, oxygen sensors, spectral analysis sensors, and combinations thereof.

Further, the sensors 125*a*-125*e* may be communicatively coupled to the dilution control system 100 such as the processor 110, to a communications gateway 210, or other networked components, and such communicative coupling may be wired or wireless according to the various communication modes disclosed herein.

Separate from the sensors 125*a*-125*e*, implementations may further include one or more additional sensors 127 downstream of the sensors 125*a*-125*e* for use in sensing combinations of mixed solutions, such as a combination of mixed solutions from mixed solution outlets 124*a* and 124*b*. The one or more additional sensors 127 may be configured to sense the same or a different tracer component from the tracer components sensed by sensors 125*a* and 125*b*. The additional sensors may be used to determine that the combination of mixed solutions is present in a target amount, and may be communicatively coupled to the dilution control system 100 in the same manner as the sensors 125*a*-125*e* to enable the dilution control system 100 to adjust a level of one or more of the solutions dispensed in the combined mixed solution.

The tracer components sensed by the sensors 125*a*-125*e* may be one or more of electrolytes, acids, bases, dissolved solids, dyes, or other components having properties capable of being sensed by a sensor. The tracer component may be present in the solution at a pre-defined ratio relative to the solution and may be evenly distributed therein. For instance, the tracer component may be native to or may be added to the solution at the time of manufacture, at the time of coupling the solution supply to the dilution control system 100, or combinations thereof. In some implementations, the motive fluid may be free of tracer components, may include one or more tracer components in insufficient amounts to be sensed by a sensor, or the sensors may be calibrated such that amounts of tracer component present in the motive fluid are excluded when calculating the dilution rate of the solution containing the pre-defined amount of tracer component.

In one example, an electrolyte tracer component may be sensed by an electrical conductivity sensor. Electrolyte tracers may include but are not limited to sodium chloride (NaCl) (e.g., $Na^+$), potassium chloride (KCl) (e.g., $K^+$), and phosphates such as potassium phosphate ($KH_2PO_4$) or sodium phosphate ($Na_3PO_4$). An acidic or basic tracer component may be sensed by a pH sensor. Acids may include but are not limited to citric acid and phosphoric acid. Bases may include but are not limited to ammonia, aluminum hydroxide, and zinc hydroxide. A dye tracer component may be sensed by a colorimeter sensor.

Figure 2:
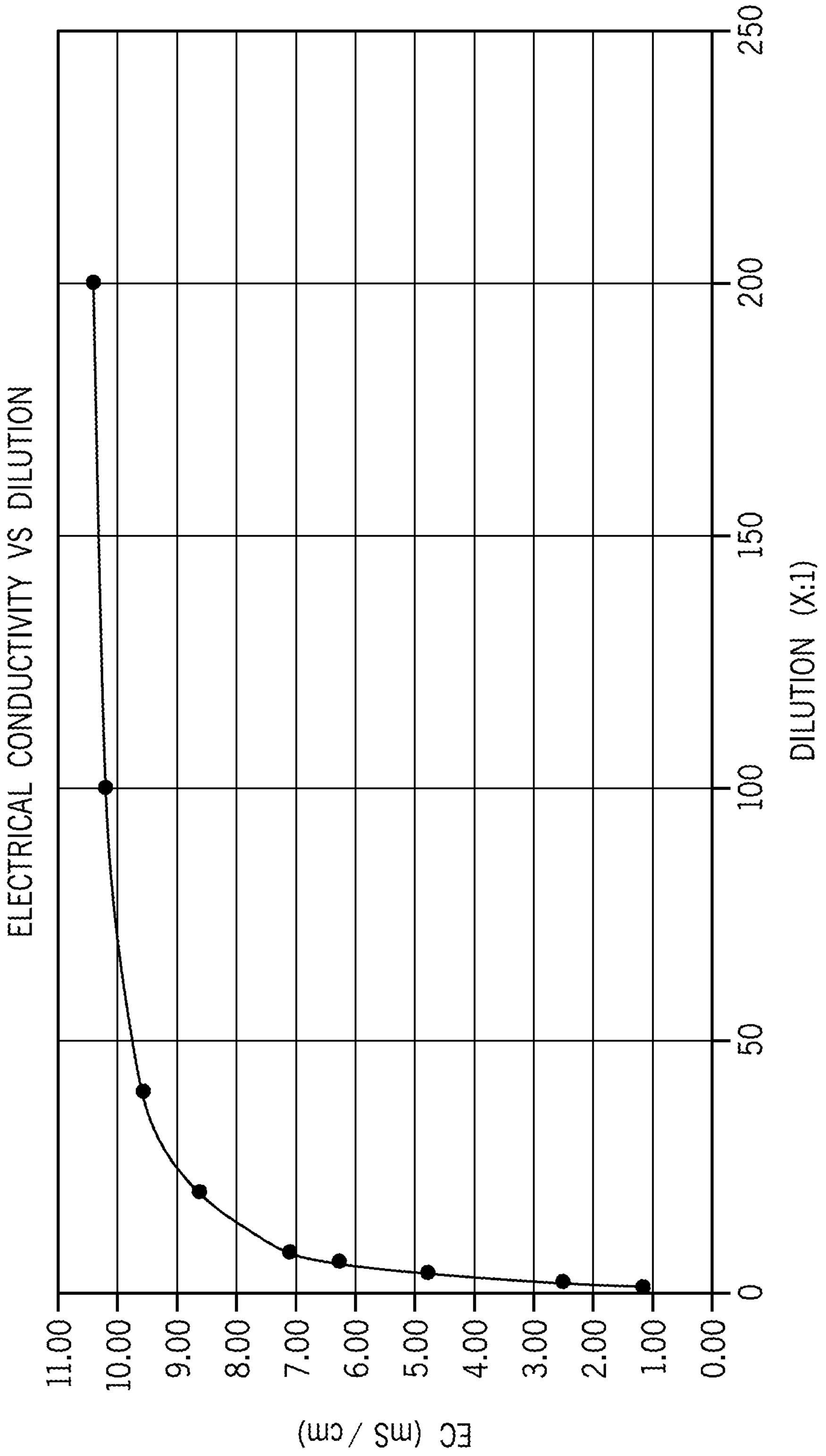
FIG. 2 shows an exemplary graph of dilution as a function of electrical conductivity where an electrolyte tracer component is present in a solution, according to the present disclosure.

FIG. 2 shows an exemplary graph of dilution as a function of electrical conductivity where an electrolyte tracer component is present in a solution at a pre-defined ratio, according to the present disclosure. Because electrolytes dissolve in water-based solutions and the electrolyte ions (e.g., $Na^+$ and $K^+$) are electrically conductive, the electrolytes in the dilution solution may be sensed by the conductivity sensor as a level of electrical conductivity of the diluted solution. Accordingly, in FIG. 2, the x-axis corresponds to dilution (X:1) and the y-axis corresponds to electrical conductivity in millisiemens per centimeter (EC (mS/cm)). In FIG. 2, as the dilution increases in the mixed solution, the conductivity of the tracer is reduced, whereas the higher concentration of solution in the mixed solution results in an increased conductivity. The electrical conductivity sensor may be configured to sense a range of electrical conductivity of 0 to 11.0 mS/cm in the mixed solution, and the dilution of the tracer component and thus the solution may be calculated based thereon for use in accurately metering the solution into the motive fluid. Although the graph of FIG. 2 illustrates the relationship between dilution and electrical conductivity, it will be understood from the present disclosure that the relationships between dilution and other properties of the solution may be provided in graphical form and the relationship recorded for purposes of determining and adjusting dilution rates of mixed solutions.

In some implementations, the processor 110, which may be onboard with the sensor(s) (e.g., sensors 125*a*-125*e*) or communicatively coupled to the sensor(s), may calculate or determine the dilution of the tracer component. In some implementations the processor 110 may be programmed with tracer component information and its respective solution product information from a user or from an equipment manufacturer, and for instance, may receive the data points from the graph of FIG. 2. In addition or alternatively, the processor 110 may be configured to use the sensor to analyze a ratio of a tracer component to a solution. The processor 110 may be programmed with a target amount of tracer component to be detected by the sensor based on a target dilution rate and based on the ratio of tracer component to solution. For instance, the processor may receive a target dilution rate and determine the target amount of tracer component to be detected using a known ratio of tracer component to solution.

In an exemplary implementation using an electrical conductivity sensor in the dilution control system 100, where a target rate of dilution of the tracer component is at 50, the target conductivity may be at 9.8 mS/cm as illustrated in FIG. 2. As the dilution control system 100 meters solution into the mixing chamber and mixed with the motive fluid, and where the sensor senses a relatively higher conductivity in the mixed solution, e.g., 10.5 mS/cm, an excessive amount of tracer component and therefore solution may have been dispensed into the motive fluid; where the sensor senses a lower conductivity in the mixed solution, e.g., 9.0 mS/cm, an insufficient amount of tracer component and therefore solution may have been dispensed into the motive fluid; and where the sensor senses a conductivity of 9.8 mS/cm the tracer component and solution may have been dispensed in the motive fluid at the correct ratio to reach a target dilution rate of 50. Using the conductivity reading, the dilution control system 100 may adjust a rate of solution dispensed at one or more of the metering devices 126*a*-126*e* to reach a target dilution rate such as by adjusting a fluid pressure, adjusting revolutions per minute of a pump, and/or adjusting the size of an orifice from which the solution is dispensed into the motive fluid. The sensor may continue to sense the level of the tracer component in the mixed solution a mixing continues and the rate of solution dispensed may continue to be adjusted until the target conductivity, and therefore dilution rate, is sensed by the sensor.

The sensor may be configured to operate continuously and may provide real time feedback to the dilution control system 100, may operate periodically, such as during a period when an actuator (e.g., solenoid valve) is active and motive fluid flows into the solution delivery system 120, during a period when a new solution supply is coupled to the solution delivery system 120, and/or may operate on a schedule for instance set by the microprocessor. In some implementations, the dilution control system 100 may be configured to adjust dilution settings upon reaching a threshold that exceeds a maximum or minimum range of acceptable levels of sensed tracer component, e.g., +/−0.2 units. The sensor may be powered by the same power source powering the solution delivery system 120 or may be powered separately, such as by a power source operating the microprocessor 110, or by a power source dedicated to the sensor or to a group of sensors associated with the dilution control system 100.

Figure 3:
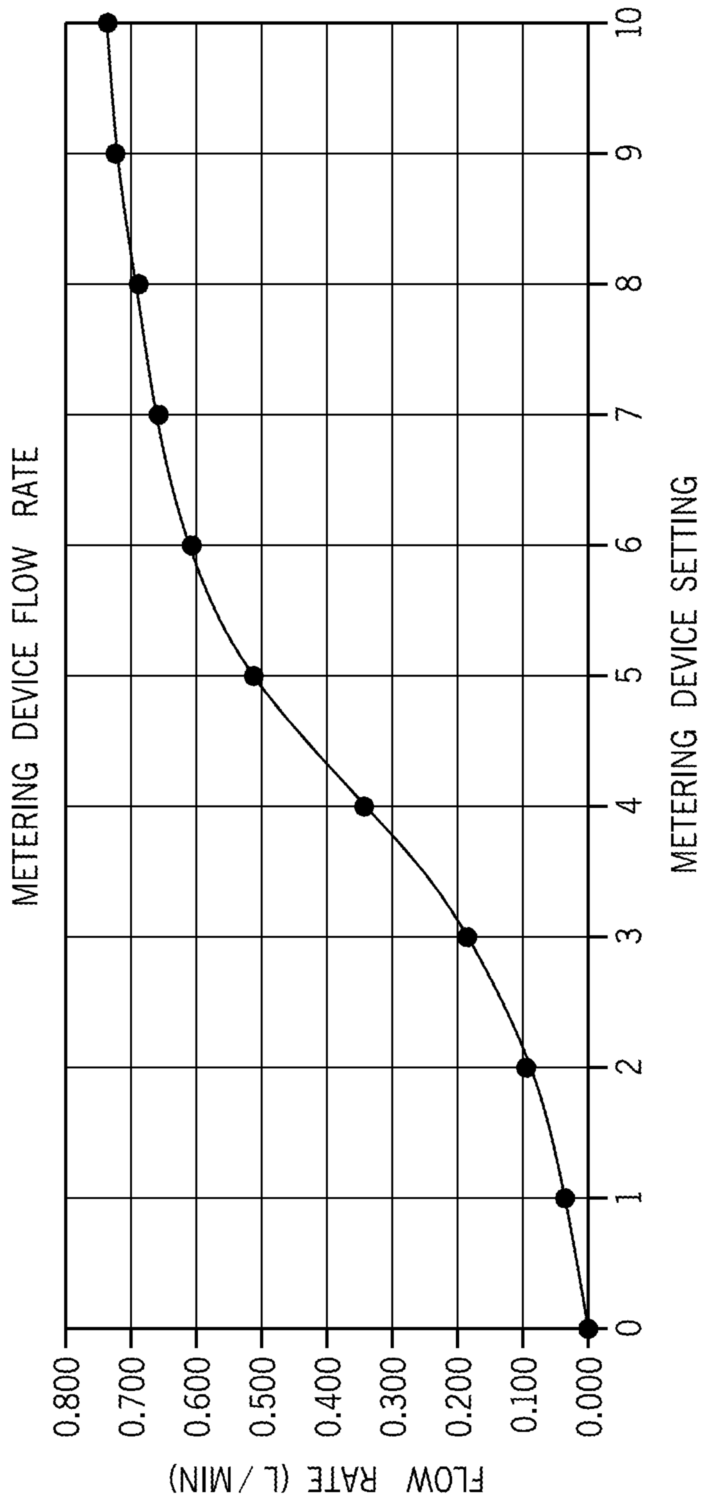
FIG. 3 shows an exemplary graph of flow rate as a function of a metering device setting where the metering device controls a rate of solution injected into the motive fluid, according to the present disclosure.

FIG. 3 shows an exemplary graph of metering device flow rate as a function of a metering device setting (e.g., one of metering devices 126*a*-126*e*) to control a rate of solution introduced (e.g., injected) into the motive fluid, according to the present disclosure. In FIG. 3, the x-axis corresponds to a metering device setting and the y-axis corresponds to a flow rate in Liters per minute. As the metering device setting increases from 0 to 10, the flow rate increases from 0 L/min to a maximum of 0.75 L/min. The dilution control system 100 may be programmed to adjust the metering device setting based on the sensed target level of tracer component to reach the target level of tracer component. For instance, the metering device may have an initial flow setting, e.g., in the range of 0 to 10 in increments of 1, where the initial flow setting is believed to correspond to the target level of tracer component in the mixed solution; and using the sensed level of tracer component, the actual level of tracer component present in the mixed solution may be determined to enable the processor to adjust the metering device's flow setting to increase or decrease the amount of tracer component metered therefrom to reach the target flow rate.

In addition or alternatively, the dilution control system 100 may adjust the dilution rate by adjusting the amount of motive fluid delivered per unit of solution at the fluid chambers 122*a*-122*e* or at the motive fluid inlet 121 of the solution delivery system 120.

While the dilution control system 100 may adjust the metering device and/or the motive fluid delivery rate to reach a target dilution rate for later produced mixed solutions, the dilution control system 100 may be further configured to manipulate the dilution of existing analyzed mixed solutions to reach a target dilution rate. For instance, water may be added to the existing and analyzed mixed solutions when under-diluted, or by adding solution or a more concentrated mixed solutions when over-diluted. This approach may enable the dilution of an existing amount of the mixed solution, e.g., a batch of the mixed solution, to be adjusted to reach a target dilution rate before being delivered to downstream locations.

Where each sensor is configured to sense a particular tracer component in the solution, or a particular range of tracer component, and where a sensor is unable to sense the tracer component in the mixed solution, this may correspond to a low or empty solution supply, may correspond to an incorrect solution being diluted in the mixed solution, or may correspond to an excessive amount of motive fluid being delivered, and the sensor may send an error signal to the dilution control system 100 such as the processor 110 for taking subsequent action. For instance, the error signal may result in the solution delivery system 120 or the corresponding solenoid valve 120*a*-120*e* being disabled until the error has been resolved. In addition, where the sensor senses an amount of tracer in the mixed solution that exceeds a maximum amount of tracer that the sensor is calibrated to sense, the sensor may send an error signal to the dilution control system 100, which may correspond to an improperly functioning motive fluid or solution supply, and the error signal may result in disabling the solution delivery system 120 or a corresponding solenoid valve 120*a*-120*e* until the error has been addressed. In some implementations, the dilution control system 100 may be configured to require the sensor to sense the tracer in the mixed solution at the targeted level before the mixed solution is delivered to downstream components. In this case, the dilution control system 100 may cause the mixed solution to be discarded or held in a batch volume until the target level of tracer is sensed.

The solution delivery system 120 may be configured to additionally include: pumps, motors (e.g., stepper motors), sensors (e.g., thermometers, cameras), heating elements, servo actuators, or another actuator that requires electric control.

In certain implementations, the processor 110 may receive signals from the dilution control system 100, e.g., indicating an operational status the solution delivery system 120, the sensors 125*a*-125*e*, as well as signals and information from other communicatively coupled components such as other dilution control systems (e.g., 100'), actuators, motors, variable frequency drives, pumps and valves, sensors, a communications gateway with in the setting housing the dilution control system 100, and from network components outside of the setting housing the dilution control system 100, for use in controlling the solution delivery system 120. For instance, the processor 110 may be programmed to sense or receive information about power to the overall system, power to the dilution control system 100, connectivity to a network, the number of operations of the dilution control system 100 (e.g., dispensing events, timing of dispensing events), solution (e.g., concentrated chemical) supply levels, dilution level, chemical conductivity, pH of a mixed solution, pH of a chemical, pH of water, temperature of the water, temperature of the solutions, ambient temperature, humidity, target to be treated, the location of the dilution control system (e.g., GPS components or arrangement within a setting), age, wear, or operational status, and a network identifier.

In one example, the number of cycles or duration a dilution control system 100 has been in use may be determined by the processor 110 and may provide reporting to the network components based thereon. The processor 110 may be programmed to generate different control signals for operating the dilution control system 100 using the gathered information. The processor 110 may instruct motors or pumps to be powered on for a longer duration as the dilution control system 100 ages in order to reduce wear on the component from frequent on/off cycles. Other examples may involve the processor 110 generating control signals to adjust pump pressure, solution use, dilution ratios, and so on.

In some implementations, the solution delivery system 120 may operate by a single control voltage, which may be 24 VDC, provided by the power source 130. However, the solution delivery system 120 may be configured to accept any common control voltage, e.g., 24 VAC, 24 VDC, or 120 VAC, ±20%, and so on, from the power source 130. The power source 130 may be integrated into the dilution control system 100 or may be arranged separately within the confines location where the dilution control system 100 is situated and may be configured as a breaker box, for example. The power source 130 may be independent of any power source of the external controller 101, which provides autonomy to the dilution control system 100.

An optional pump 140 of the dilution control system 100 may provide fluid pressure to the dilution control system 100. The pump 140 may be communicatively coupled to the processor 110 and the power source 130 and may be configured to deliver fluid pressure to operate the solution delivery system 120 such as by pressurizing motive fluid for delivery to the solution delivery system, which pressurized motive fluid may enter via the fluid inlet 121 or be pressurized by the pump 140 at the fluid inlet 121. For instance, upon receipt of power from the power source 130 in response control signals from the processor 110, the pump 140 may deliver fluid pressure over a pre-determined timing cycle to a fluid input line of the solution delivery system 120. The pump 140 may provide water pressure to the dilution control system 100, which may provide pressure assistance to a water supply, e.g., a municipal water supply, or may provide the sole source of pressure to the water input of the dilution control system 100 and for instance may be responsible for delivering motive fluid to the motive fluid inlet 121 of the solution delivery system 120.

The pump 140 may also provide pressure to a solution input of the dilution control system 100, however, the solution input may alternatively rely on vacuum pressure for fluid delivery into the dilution control system 100, for instance using venturi valves, which are disclosed in U.S. Pat. No. 8,887,743 B2. The pump 140 may include a processor 141 communicatively coupled to the processor 110 of the dilution control system 100 and operation of the pump 140 may be controlled through communications between the processors 110, 141. As can be appreciated, in some implementations, the pump 140 may be a dilution control system 100 that cooperates with other dilution control systems, e.g., a second dilution control system 100', as described.

In some implementations, the processor 110, the solution delivery system 120, the power source 130, and/or the pump 140 may be housed within the dilution control system 100, and may be integrated into the same dispensing panel. In a further example, the processor 110 may be wired or wirelessly coupled to the dilution control system 100. For instance, the processor 110 may be wired to multiple, individual actuators, all of which may be housed within a dispensing panel.

According to implementations of the present disclosure where an external controller 101 control distribution of solutions to the solution delivery system 120 or where the external controller 101 controls the solution delivery system 120, the processor 110 may receive a sensed voltage from the external controller 101 to cause a level of solution to be delivered at a pre-determined setting to reach a target dilution rate, and the processor 110 may instruct the solution delivery system 120 of the dilution control system 100 to be powered via the power source 130 at a voltage independent of the sensed voltage. Where the actual dilution rate sensed by the sensor, e.g., sensor 125*a*-125*e*, differs from the target dilution rate, the processor 110 of the dilution control system 100 may override the external controller 101 and cause the power source 130 to operate the solution delivery system 120 such that a level of the solution dispensed from the solution delivery system 120 is adjusted, e.g., increased or decreased, to reach the target dilution level.

In such implementations where the dilution control system 100 operates in combination with a customary external controller 101, the external controller 101 may be a customary power source that delivers timed voltage signals to multiple systems in the setting where the dilution control system 100 is arranged, including solution delivery systems, and may typically deliver common control voltages of: 24 VAC, 24 VDC, or 120 VAC, ±20% to operate these multiple systems, including fluid management and dilution systems. However, the processor 110 of the dilution control system 100 may instead interpret the control voltage of the external controller 101 simply as a signal (e.g., a sensed voltage), and instead of allowing the same signal to be relayed to the solution delivery system 120 of the dilution control system 100, the processor 110 may interpret the signal (e.g., as a signal meant to perform some action or operation by the dilution control system 100), generate a different control signal and send this to the solution delivery system 120 for dispensing solutions according to the commands of the dilution control system 100. Thus, while the external controller 101 may control the operation of other devices in this setting, the external controller 101 may more simply deliver a signal to the dilution control system 100 for subsequent interpretation by the processor 110 and action. This configuration may provide the dilution control system 100 autonomy relative to other devices that may be controlled in a customary manner by the external controller 101. For instance, the external controller 101 may be responsible for controlling air, water, solution dispensing, and/or coordinating other aspects related to fluid management and delivery by using programmable logic controller (PLC) or similar technology and may send signals to various components in the setting. These signals might be control voltages, analog signals, or digital signals. While the external controller 101 may control a variety of different devices, the dilution control systems 100 of the present disclosure are responsible for orchestrating their own operation due to their ability to interpret control signals received from the external controller 101 and generate new control signals for operation of the dilution control system. A number of components may be controlled by the external controller 101, while dilution control systems (e.g., 100, 100', 100") provided according to the present disclosure, may operate independently from the external controller's 101 commands.

In implementations where the processor 110 is programmed to generate a separate signal from the external controller 101, the dilution control system 100 may be operated using different operating parameters relative to the parameters sent by the external controller 101. The processor 110 may be configured to receive control signals from the external controller 101 and/or from the communications gateway 210, and/or from other processors 110 of other dilution control systems described herein, and based on a variety of information collected by the processor 110, the processor may generate a new control signal and send to the solution delivery system 120 of its dilution control system 100 in a dedicated manner. For instance, the processor 110 may be programmed to track operations of the dilution control system 100 and generate control signals for operation of the dilution control system 100 based thereon. The processor 110 may query its communicatively coupled components for information that can affect the operating parameters of the dilution control system 100 and may be used by the processor 110 to configure the control signal using the received information. In some implementations, the processor 110 may be configured to only receive commands from the external controller 101 and/or the communications gateway 210, and/or from other processors of other dilution control systems, but may not be configured to send instructions to these components.

Figure 1B:
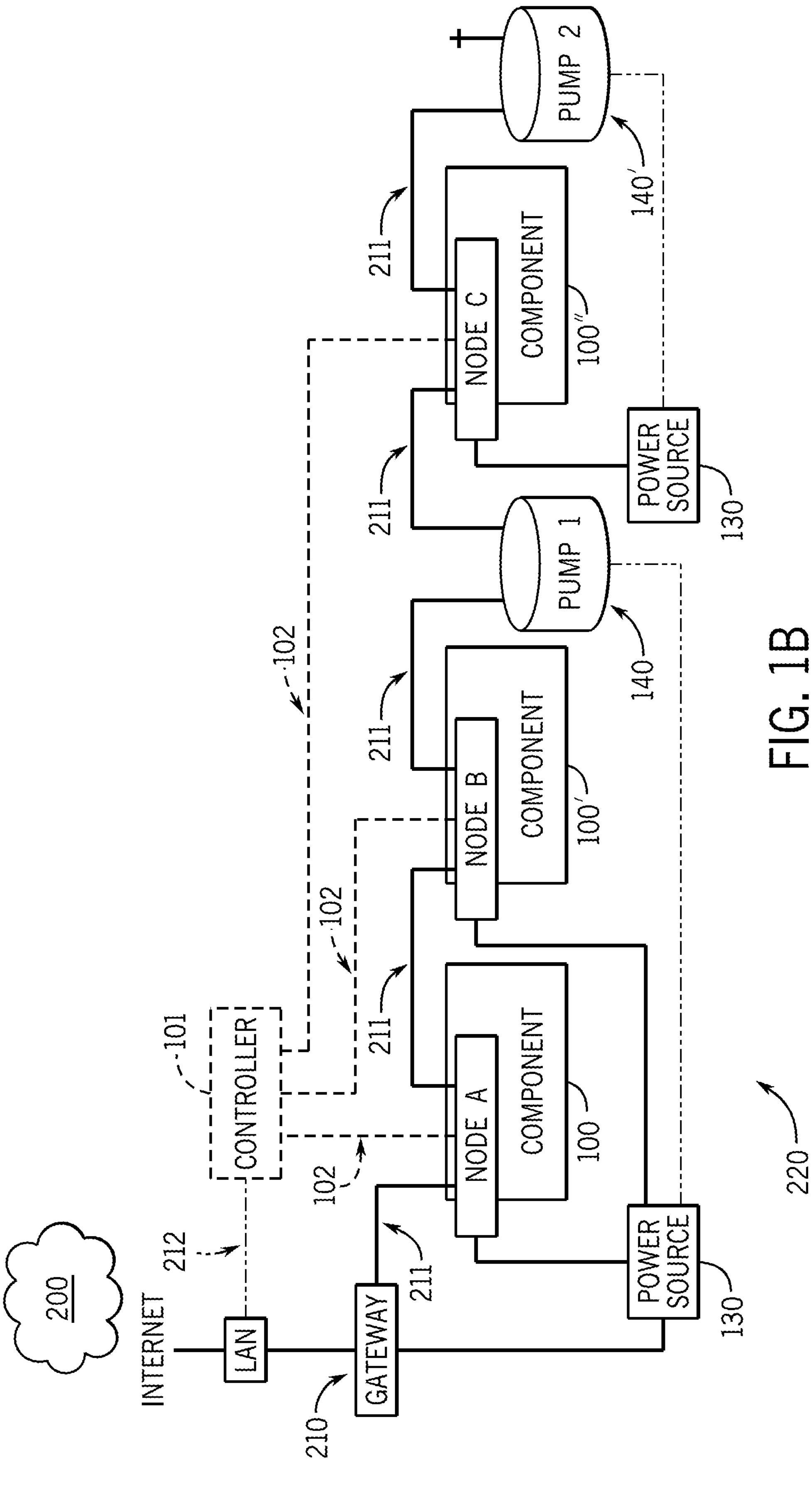
FIG. 1B illustrates the dilution control system communicatively coupled to a local communications gateway for use in facilitating fluid delivery operations in a fluid delivery control system, according to implementations of the present disclosure.

Turning to FIG. 1B, the dilution control system 100, also referred to as a component 100 and a member of components 100, 100', 100", may be may be communicatively coupled to a local communications gateway 210 for use in facilitating fluid delivery operations in a fluid delivery control system 220 with other components 100', 100" of the fluid delivery control system 220, according to implementations of the present disclosure. The components 100', 100" may for example be configured as dilution control systems including the components of the dilution control system 100, as described, and/or as solenoid valves, pressure gauges, pumps, motors, sensors, heating elements, servo actuators, other actuators, and so on. As shown in FIG. 1B, the power source 130 may provide power to the components of the fluid delivery control system 220 and optionally pumps 140; however, the power source 130 may be separate from any power source derived from the optional external controller 101 to allow for the independent operation of the components of the fluid delivery control system 220.

The communications gateway 210 may be configured with a processor and coupled to the system components 100, 100', 100" via connection 211 (e.g., a serial connection) and the external controller 101 via connection 212. Each fluid delivery control system 220 may include its own communications gateway 210 and the gateway 210 may be coupled to remote locations via the internet, as well as to other devices at the fluid delivery control system 220 via the internet via a local area network (LAN) or other near range communication equivalents, e.g., Wi-Fi, Bluetooth or LoRa, RFID, NFC, ANT, Zigbee, or WLAN, or via long range communication equivalents such as WAN. The communications gateway 210 may troubleshoot or fix problems with the components 100, 100', 100" and may send programming updates to processors of these components (e.g., processor 110), for example.

Where multiple components (e.g., 100, 100', 100") are used in one fluid delivery control system 220, the components may operate independently of one another. In addition or alternatively, the dilution control system 100 may receive information about itself, e.g., over-dilution or under-dilution such as due to a worn out or occluded metering device nozzle, and sends this information to the gateway 210 for taking action. For instance, the gateway 210 may instruct a second component 100' to deliver a mixed solution therefrom so as to compensate for the problems with at the dilution control system 100. In addition, the processor 110 of the dilution control system 100 may send information to the communications gateway 210 indicating that the dilution control system 100 requires maintenance or service. In addition or alternatively, the components (e.g., 100, 100', 100") may communicate directly with each other for assisting or controlling operation of their respective electrical components, e.g., solution delivery system 120. In this example, the processors 110 of the respective components 100, 100', 100" may be configured to communicate with one another, for instance using the disclosed near range communication technologies, and one or more of the processors may send control signals to the other component for subsequent interpretation and generation of a control signal as described herein.

Some components may be responsible for sensing conditions that may impact operating parameters of the dilution control system 100 (e.g., water usage, solution usage, water temperature), while others may use the sensed information to dynamically adjust the operation of the dilution control system 100 (e.g., to decrease water, increase solution, deliver cold water) or to determine whether the component operates at all. Accordingly, examples of communicative coupling between the communications gateway 210 and components 100, 100', 100" include providing sensed information such as temperature, humidity, pH level, solution supply level, dilution level, or soil level, soil type, age, wear, or operational status, from one component to the gateway 210. The gateway 210 may interpret the information, and generate control signals for operation of one or more of the components 100, 100', 100". For instance, the processor 110 of the second component 100' may sense temperature information regarding ambient temperatures, water temperatures, solution temperatures, and/or mixed solution temperatures, and may transmit this sensed information to the gateway 210 for use in adjusting the operating parameters of the dilution control system 100, such as to adjust the temperature of the motive fluid or increase or decrease an amount of solution used in the mixed solution. In addition or alternatively, the communications gateway 210 may serve as a communications relay between the components without interpreting the information, and the processor 110 of the dilution control system 100 may interpret the received information and generate a control signal accordingly.

In FIG. 1B, the external controller 101 may optionally be coupled to the dilution control system 100 as well as other components 100', 100", each via connection 102, which may be a multi-conductor cable often called a "home run cable". The components 100, 100' and 100" of the fluid delivery control system 220 may each be coupled to the communications gateway 210 via a serial connection 211, such as a MODBUS RTU serial connection. The communications gateway 210 may be directly coupled to the external controller 101 via coupling 212, such as local area network (LAN) connection. The components 100, 100', 100" may operate independently of one another as described herein, and optionally may operate in concert with one another, for example, by way of the communications gateway 210 and the serial connection 211. In some implementations, the components 100, 100', 100" may be communicatively coupled via peer-to-peer connections such as near range communications including Wi-Fi, Bluetooth or LoRa, RFID, NFC, ANT, Zigbee, or WLAN or via long range communication equivalents such as WAN.

Multiple communications gateways 210 may be connected to a network 200 over the internet. Local network connections between the components 100, 100', 100" and the communications gateways 210 may include but are not limited to serial connection such as RS485 connections, Ethernet/LAN, Wi-Fi, Bluetooth, mobile data connections, and expandable connections.

In some implementations, the network 200 may transmit information to a user interface related to connectivity, usage, diagnostics, and so on for the dilution control system 100 at the various fluid delivery control systems 220 having a respective communications gateway 210. The user interface may be delivered through a web application. The user interface may be graphically configured to include information about each of the components 100, 100', 100" at a given fluid delivery control system 220, along with operating parameters such as: solution name, injector used, dilution setting, sensed tracer or dilution levels, alert settings, sensor connectivity, etc. The graphical interface may enable the user to set alerts and configure parameters such as dilution settings.

In some implementations, a user may transmit information to the network 200 via the user interface, and for instance, may make product orders or request service calls for addressing problems at the various fluid delivery control systems 220. Due to the ability of the communications gateway 210 to provide information about individual components 100, 100', 100", each having their own unique ID, product orders may identify a specific component where the order is to be delivered and used.

The network 200 may receive periodic updates from the communications gateway 210, such as weekly, and the network 200 may be configured to aggregate this information for reporting. Critical conditions such as inventory levels and key maintenance events may be sent more frequently to the network 200. In addition or alternatively, the network 200 and/or the communications gateway 210 may be communicatively coupled to bar code readers, automatic inventory reconciliation, in bay applicators, custom solution containers, maintenance logs and so on. The network 200 may use collected information for reporting, advanced analytics and predictive statistics (e.g., based on environmental factors).

Figure 4:
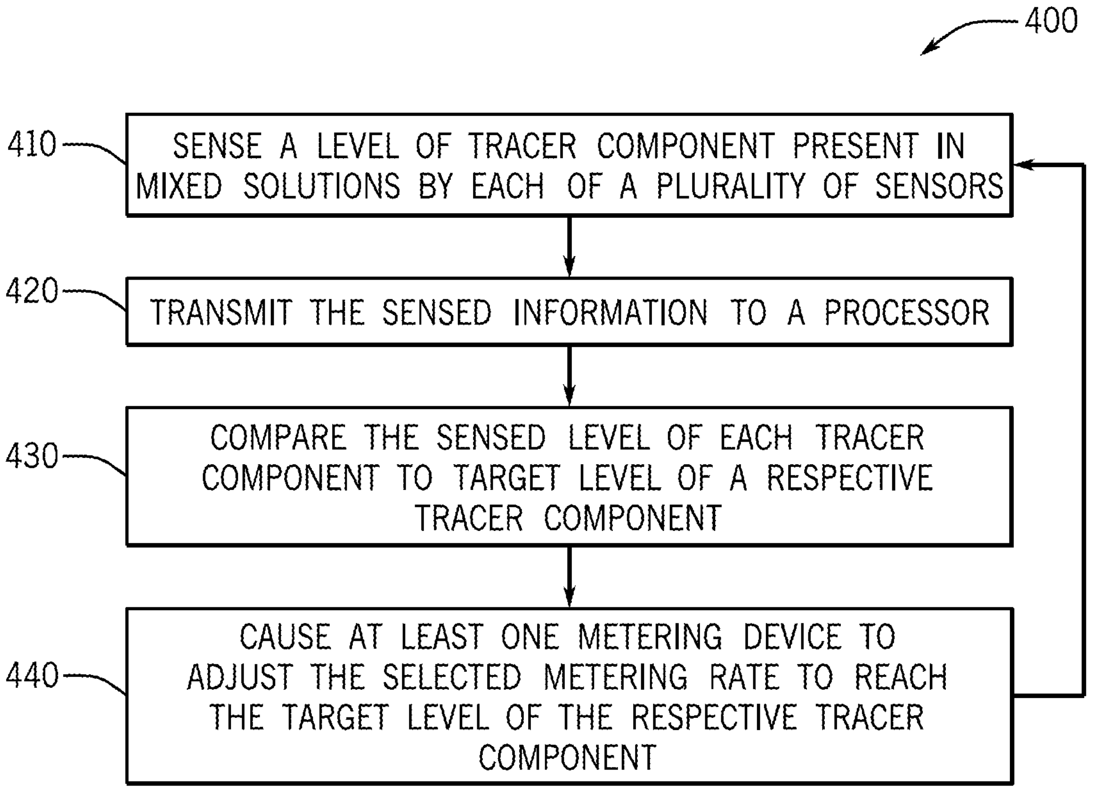
FIG. 4 is a flow diagram of a method of using the dilution control system according to the present disclosure.

FIG. 4 is a flow diagram of a method 400 of using the dilution control system 100, which may be coupled to the network 200, according to the present disclosure. The method 400 begins by the sensors 125*a*-125*e* sensing a level of the tracer component present in the mixed solution (operation 410). The sensed information is transmitted to the processor 110 (operation 420). The processor 110 compares the sensed level of each tracer component to a target level of a respective tracer component corresponding to the selected dilution rate (operation 430). The processor 110 causes a rate of dilution of one or more solutions containing the sensed tracer component to be adjusted to reach the target level of the respective tracer component (operation 440). Operations 410-440 may be repeated until the processor determines that the sensed level of tracer component corresponds to the target level of the respective tracer component such that the actual dilution rate of the solution matches the target dilution rate.

Method 400 may be modified using various approaches as will be appreciated by those skilled in the art. In one example, the method 400 may be conducted by a processor, a metering device and a sensor, each configured similarly to the processor 110, one of the metering devices 126*a*-126*e* and one of the sensors 125*a*-125*e*, respectively, disclosed herein. In this example, the components may operate to control the dispensing of solution into a motive fluid supply, and the processor, metering device and sensor may be independent from certain functions and structures of the dilution control system 100, while continuing to perform the operations of method 400. Further, the processor in this alternative may be communicatively coupled to the dilution control system 100 to facilitate operation of the system 100 as a whole.

In another example, a signal from the external controller 101 may be received by the processor 110 for metering a level of solution to reach a selected dilution rate, and the processor causes the rate of dilution of the one or more solutions to be adjusted by generating a separate signal from the signal received by the external controller, and may send the generated signal to a metering device configured to adjust the rate of dilution. Other modifications to method 400 will be apparent from the present disclosure.

The disclosed embodiments may be combined with the features of the sensing and control systems and methods of the disclosure of U.S. Publication No. US 2021/0349482 A1 is incorporated herein by reference for any useful purpose.

Various changes may be made in the form, construction and arrangement of the components of the present disclosure without departing from the disclosed subject matter or without sacrificing all of its material advantages. The form described is merely explanatory, and it is the intention of the following claims to encompass and include such changes. Moreover, while the present disclosure has been described with reference to various embodiments, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A fluid dilution control system, comprising:

a processor;

a solution delivery system comprising a plurality of actuators, a plurality of fluid chambers, and a plurality of metering devices, wherein each of the plurality of actuators is coupled to a fluid chamber of the plurality of fluid chambers, and each of the plurality of metering devices is coupled to a fluid chamber of the plurality of fluid chambers; and a plurality of sensors communicatively coupled to the processor, each of the plurality of sensors arranged downstream of a respective fluid chamber of the plurality of fluid chambers and configured to sense a tracer component in a mixed solution of solution and motive fluid formed in the respective fluid chamber, the tracer component present in a pre-defined amount in the solution prior to being mixed in the mixed solution, wherein each of the plurality of sensors senses a level of the tracer component present in the mixed solution and transmits the sensed information to the processor, wherein the processor compares the sensed level of each tracer component to a target level of a respective tracer component, and wherein the processor causes at least one metering device of the plurality of metering devices to adjust a rate of dilution of at least one solution containing the sensed tracer component to reach the target level of the respective tracer component.

2. The system of claim 1, wherein the processor confirms a target dilution rate has been reached by determining an adjusted level of the tracer component present in the mixed solution corresponds to the target level of the respective tracer component.

3. The system of claim 1, wherein each of the plurality of sensors is coupled to a fluid line holding the mixed solution containing the respective tracer component, wherein the fluid line is arranged downstream from a respective metering device and from a motive fluid source.

4. The system of claim 1, wherein at least one metering device of the plurality of metering devices comprises a solution inlet of an eductor configured to receive the solution and the motive fluid in a mixing chamber thereof, and wherein a size of an orifice supplying the solution to the solution inlet is adjusted to reach the target level of the respective tracer component.

5. The system of claim 1, wherein at least one metering device of the plurality of metering devices comprises a positive displacement pump configured to impinge on a solution delivery tube of the at least one metering device, and wherein a rate of displacement of the solution from the solution delivery tube is adjusted to reach the target level of the respective tracer component.

6. A fluid dilution control system, comprising:

a processor;

a solution delivery system comprising a plurality of actuators, a plurality of fluid chambers, and a plurality of metering devices, wherein each of the plurality of actuators is coupled to a fluid chamber of the plurality of fluid chambers, and each of the plurality of metering devices is coupled to a fluid chamber of the plurality of fluid chambers, wherein each of the plurality of actuators is coupled to a motive fluid supply and configured to be actuated to cause motive fluid from the motive fluid supply to flow into a port of a corresponding fluid chamber of the plurality of fluid chambers, wherein each of the plurality of fluid chambers is configured to receive the motive fluid and a solution and form a mixed solution therein, wherein each of the plurality of metering devices is configured to deliver the solution to a corresponding fluid chamber of the plurality of fluid chambers and meters the solution into the fluid chamber at a selected metering rate; and a plurality of sensors each communicatively coupled to the processor and arranged downstream of a different fluid chamber of the plurality of fluid chambers, wherein each of the plurality of sensors is configured to sense a tracer component in the mixed solution formed in one of the plurality of fluid chambers, the tracer component present in a pre-defined amount in the solution prior to being mixed in the mixed solution, wherein each of the plurality of sensors senses a level of the tracer component present in the mixed solution and transmits the sensed information to the processor, wherein the processor compares the sensed level of each tracer component to a target level of a respective tracer component, and wherein based on the comparison, the processor causes at least one metering device of the plurality of metering devices to adjust the selected metering rate to reach the target level of the respective tracer component.

7. The system of claim 6, wherein the motive fluid supply coupled to the plurality of actuators is a common motive fluid supply coupled to a pump configured to deliver the motive fluid at a constant pressure.

8. The system of claim 6, wherein each of the plurality of sensors is coupled to a fluid line arranged downstream of the plurality of fluid chambers.

9. The system of claim 6, wherein at least one of the plurality of metering devices comprises a solution inlet of an eductor, and wherein a size of an orifice supplying the solution to the solution inlet is adjusted to adjust a level of solution dispensed into the motive fluid.

10. The system of claim 6, wherein at least one of the plurality of metering devices comprises a positive displacement pump configured to impinge on a solution delivery tube of the metering device, and wherein a rate of displacement of the solution from the solution delivery tube is adjusted to reach the target level of the respective tracer component.

11. A computer network for controlling and adjusting fluid dilution, comprising:

a plurality of communications gateways, each located at a location, wherein the location is different from locations of other communications gateways from the plurality of communications gateways; and at least one fluid dilution control system communicatively coupled to each communications gateway, the at least one fluid dilution control system comprising:

an onboard processor;

a solution delivery system comprising a plurality of actuators, a plurality of fluid chambers, and a plurality of metering devices, wherein each of the plurality of actuators is coupled to a fluid chamber of the plurality of fluid chambers, and each of the plurality of metering devices is coupled to a fluid chamber of the plurality of fluid chambers; and a plurality of sensors communicatively coupled to the processor, each of the plurality of sensors arranged downstream of a respective fluid chamber of the plurality of fluid chambers and configured to sense a tracer component in a mixed solution of solution and motive fluid formed in the respective fluid chamber, the tracer component present in a pre-defined amount in the solution prior to being mixed in the mixed solution;

wherein the processor is configured to receive a signal from an external controller located at the location, the signal for metering a level of solution to reach a selected dilution rate, wherein each of the plurality of sensors senses a level of the tracer component present in the mixed solution and transmits the sensed information to the processor, wherein the processor compares the sensed level of each tracer component to a target level of a respective tracer component corresponding to the selected dilution rate, and wherein the processor causes at least one metering device of the plurality of metering devices to adjust a rate of dilution of at least one solution containing the sensed tracer component to reach the target level of the respective tracer component.

12. The computer network of claim 11, wherein the processor causes the rate of dilution of the at least one solution to be adjusted by generating a separate signal from the signal received by the external controller, and sending the generated signal to a metering device configured to adjust the rate of dilution.

* * * * *